United States Patent [19]
Goldman et al.

[11] Patent Number: 5,121,932
[45] Date of Patent: Jun. 16, 1992

[54] GASKET ASSEMBLY FOR OIL PANS AND THE LIKE

[75] Inventors: Robert B. Goldman, Evanston; Albert Henhapl, Palatine; Mark J. Adelizzi, Wheeling, all of Ill.

[73] Assignee: Fel-Pro Incorporated, Skokie, Ill.

[21] Appl. No.: 610,100

[22] Filed: Nov. 7, 1990

[51] Int. Cl.⁵ .............. F16J 15/10; B29C 33/30; B29C 37/00
[52] U.S. Cl. .................. 277/166; 277/180; 123/90.37; 264/273; 264/275
[58] Field of Search ........ 277/166, 180, 207 R, 277/235 B; 123/90.37, 90.38; 264/250, 255, 273, 275, 274

[56] References Cited

U.S. PATENT DOCUMENTS

| | | | |
|---|---|---|---|
| 3,565,449 | 2/1971 | Ascencio et al. | 277/235 B |
| 4,072,316 | 2/1978 | Decker et al. | 277/235 B |
| 4,203,941 | 5/1980 | Brooker | 264/275 X |
| 4,234,638 | 11/1980 | Yamazoe et al. | 264/273 X |
| 4,373,735 | 2/1983 | Morsbach et al. | 277/235 B |
| 4,485,138 | 11/1984 | Yamamoto et al. | 277/235 B X |
| 4,535,996 | 8/1985 | Cardis et al. | 277/166 X |
| 4,652,415 | 3/1987 | Nguyen et al. | 264/273 X |
| 4,655,463 | 4/1987 | Inciong et al. | 277/166 X |
| 4,705,278 | 11/1987 | Locacius et al. | 277/235 B |
| 4,824,627 | 4/1989 | Hammer et al. | 264/275 X |
| 4,876,915 | 10/1989 | Iuchi | 264/275 X |
| 4,955,621 | 9/1990 | Skrycki | 277/166 |
| 4,997,193 | 3/1991 | Czernik | 277/207 R X |

FOREIGN PATENT DOCUMENTS

| | | | |
|---|---|---|---|
| 1137199 | 9/1962 | Fed. Rep. of Germany | 264/274 |
| 0223399 | 6/1985 | Fed. Rep. of Germany | 264/275 |
| 0056209 | 4/1982 | Japan | 264/273 |

*Primary Examiner*—Allan N. Shoap
*Assistant Examiner*—James K. Folker
*Attorney, Agent, or Firm*—Dressler, Goldsmith, Shore, Sutker & Milnamow, Ltd.

[57] ABSTRACT

A molded oil pan gasket having an integrally formed pair of elastomeric side sections and pair of elastomeric end sections and a rail in each of the side sections. Each rail is an elongated rigid thermoplastic member having a generally flat main body of a first thickness and a plurality of integrally formed, longitudinally spaced stops. Each stop provides a fastener opening. The stops are of a height substantially greater than the first thickness, but less than the thickness of the associated side section. A plurality of apertures are formed in each rail for integrating the rail and the elastomer of the associated side section. A series of abutments and stiffening ribs are also disclosed.

4 Claims, 2 Drawing Sheets

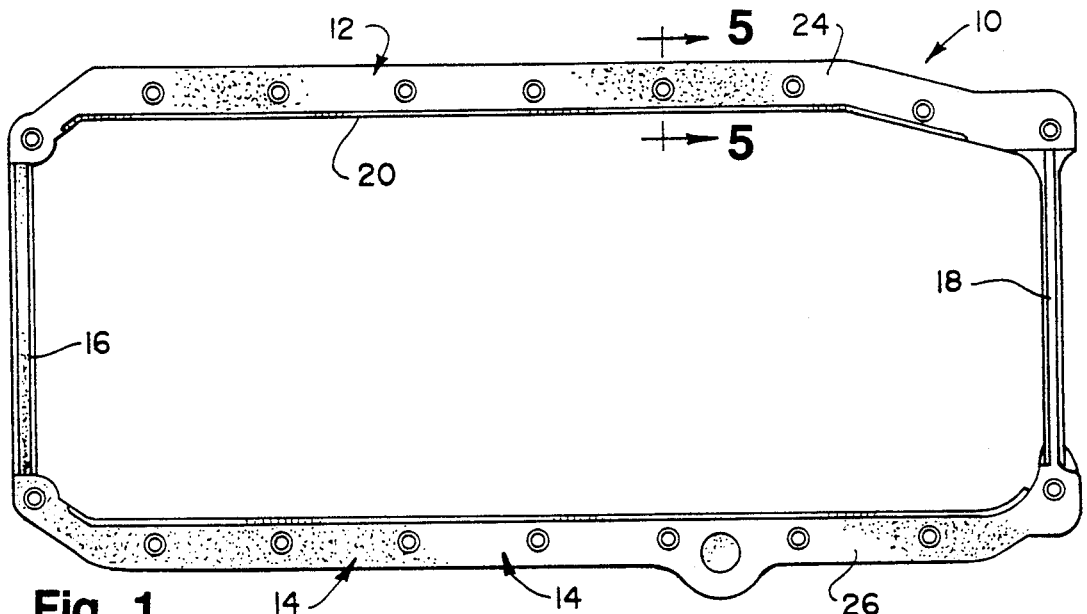
Fig. 1
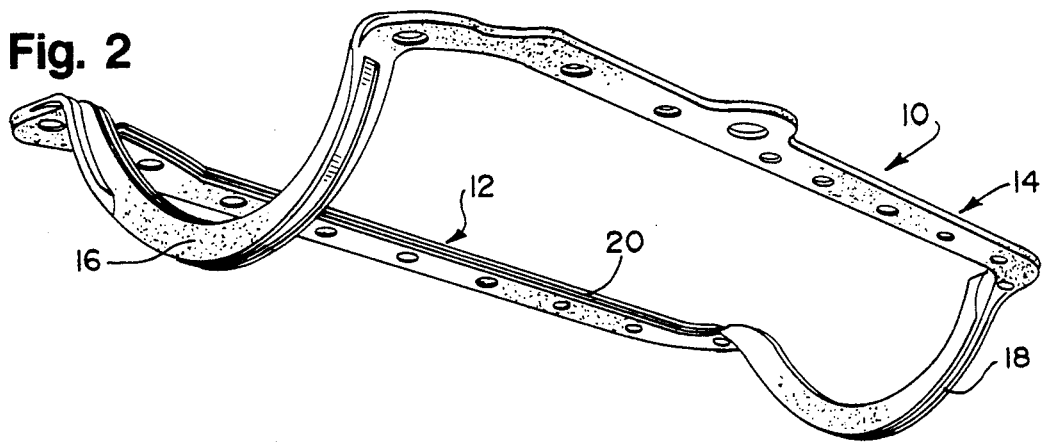
Fig. 2
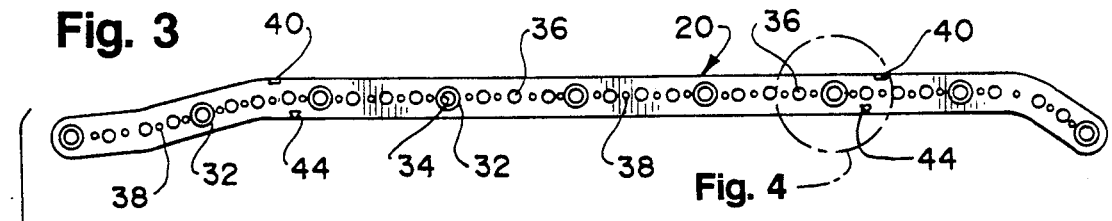
Fig. 3
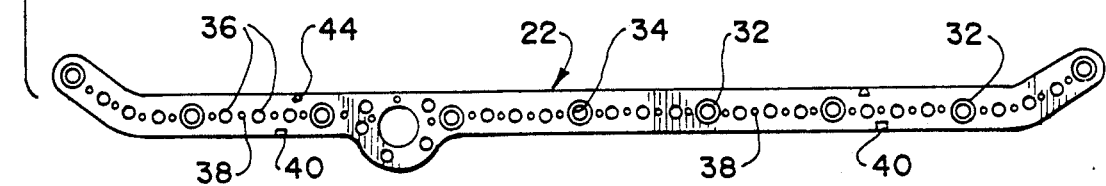

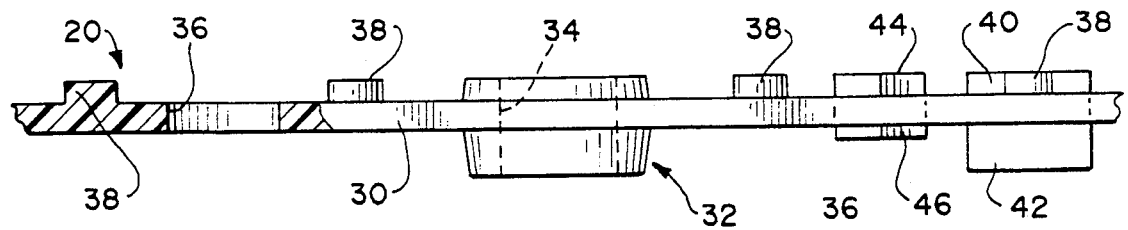
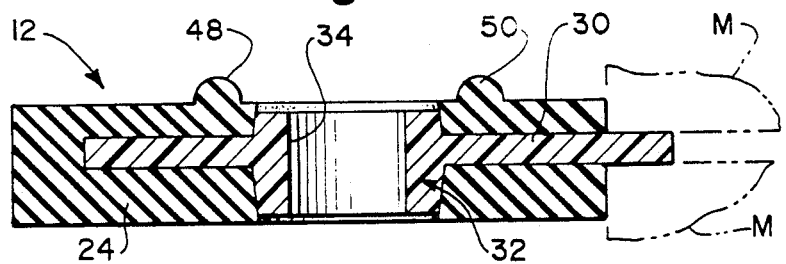
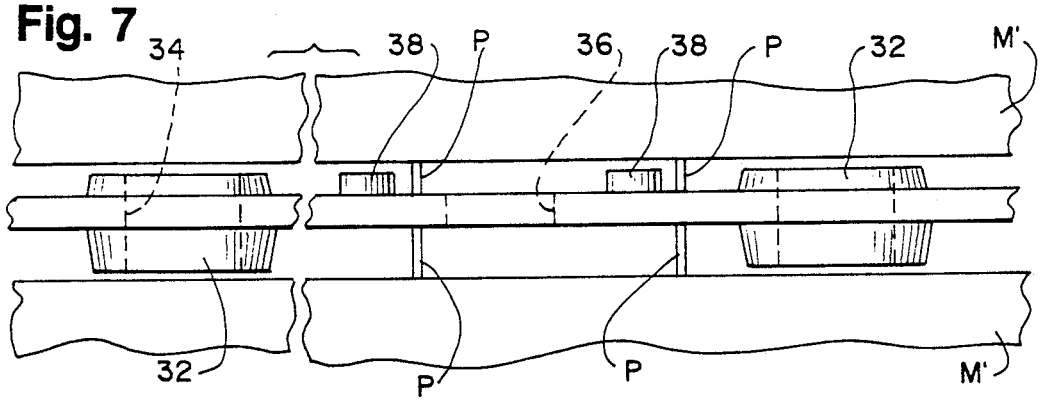
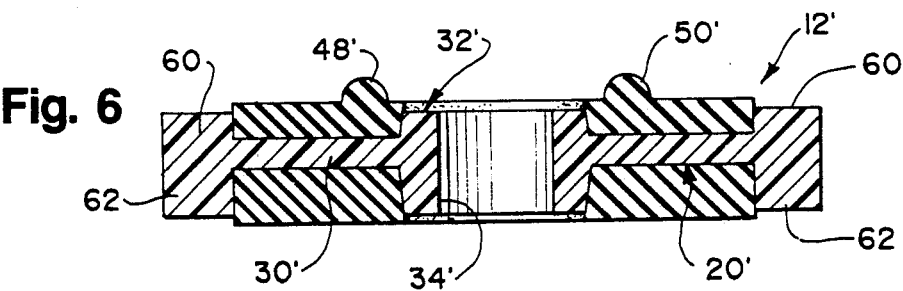

GASKET ASSEMBLY FOR OIL PANS AND THE LIKE

This invention relates to improved gasket assemblies, and particularly to improved oil pan gaskets, valve cover gaskets, and the like for automotive use.

In a typical environment in which a typical oil pan gasket of the present invention is adapted to be used, a suitable engine flange at the base of the engine is present. The flange may terminate rearwardly at a retainer, such as a centrally located rear main bearing cap which holds the bearing for the drive shaft. The flange may terminate at the front in a retainer, such as in a timing chamber cover, or at part of the oil pump structure or the like. Most frequently the mating oil pan cover has two generally flat side main flange surfaces which confront the engine flanges and two generally semi-circular recesses at the ends of the cover which receive the bearing cap and other engine component at the front. Thus, to seal in such an environment, the gasket must be generally flat along its side portions and must have end portions which are generally concave to match the generally semi-cylindrical openings in the oil pan.

In the past, frequently four pieces, two generally flat pieces and two generally concave pieces, have been used to seal in this environment, both in original manufacture and in the after-market. When it is appreciated that the gasket must be secured upside-down to the engine (especially during repair), it will be appreciated that such installation is extremely tedious and difficult, and frequently requires additional tube-dispensed sealants to be used as well.

Unitary prior art molded rubber gaskets also exist. Generally they comprise a main body defining bolt or fastener holes and concave ends. Some have been difficult to install because they are limp. They also suffer from splitting problems at the fastener holes.

Some of the prior art gaskets utilize narrow beads along their lengths around the fastener holes to assist in sealing. Some such gaskets also define additional openings adjacent the fastener holes which receive stops formed with the engine or oil pan to control compression. Other such gaskets simply utilize flat rubber main bodies.

Other prior art gaskets, such as those shown in U.S. Pat. No. 4,535,996, incorporate separate cores, such as metallic cores, embedded in the rubber main bodies. These additionally incorporate added compression stops which must be associated and assembled therewith.

It would be desirable to provide an improved oil pan gasket assembly, and in particular one which minimizes the number of parts to be assembled and utilized.

SUMMARY OF THE INVENTION

In accordance with the present invention an improved molded gasket assembly especially adapted for use as an oil pan gasket or the like is provided. The gasket assembly includes an integrally formed pair of elastomeric side sections and pair of elastomeric end sections and a rail in and associated with each of the side sections.

Each rail comprises an elongated rigid plastic member having a generally flat main body of a first thickness and a plurality of integrally formed, longitudinally spaced stops, each of which stops defines a fastener opening through which a fastener is adapted to pass. The stops are of a height substantially greater than the first thickness, but less than the thickness of the associated side section. A plurality of apertures are formed in each rail through which elastomer projects to integrate the rail and the elastomer of the associated side section.

Each of the rails desirably further includes a plurality of spaced abutments positioned along the length of the rail for appropriately positioning the rail in the side section. The abutments comprise projections extending from one surface of the rail between pairs of adjacent stops and most desirably between pairs of adjacent apertures. The abutments may also include projections which extend from opposite surfaces of the rail adjacent the edges of the rail surfaces.

In one preferred form the rails further include at least one and preferably at least two stiffening ribs projecting from one or more surfaces of the rail at right angles thereto adjacent edges of the surfaces. A pair of such stiffening ribs may project from opposite surfaces of the rail adjacent the same edges of the surfaces.

Further objects, features and advantages will be apparent from the following description and drawings.

BRIEF DESCRIPTION OF THE DRAWINGS

FIG. 1 is a bottom plan view of an oil pan gasket assembly in accordance with the present invention;

FIG. 2 is a bottom perspective view of the oil pan gasket assembly of FIG. 1;

FIG. 3 is a plan view of the rails incorporated in the gasket assembly of FIG. 1;

FIG. 4 is a fragmentary side elevational view, partially in section, of a rail of FIG. 3;

FIG. 5 is a cross-sectional view taken substantially along line 5—5 of FIG. 1;

FIG. 6 is a cross-sectional view of a further embodiment of the present invention viewed from the same location as that of FIG. 5; and FIG. 7 is a fragmentary side elevational view of a rail like that of FIG. 3 shown as supported in a mold in an alternative manner.

DETAILED DESCRIPTION

Referring now to FIGS. 1-5 of the drawings which illustrate a presently preferred embodiment of the present invention, FIG. 1 shows a gasket assembly 10 formed for use as an oil pan gasket. Gasket assembly 10 comprises a pair of generally elongate, relatively stiff side portions or sections 12, 14, and a pair of concave or arched end sections 16, 18.

Each of the side sections 12, 14 defines a plurality of fastener openings and comprises a stiff rail 20, 22, respectively, embedded within a molded elastomeric or rubber sheath 24, 26, respectively. The elastomer may vary and may desirably be nitrile, polyacrylic or silicone rubber. The end sections 16, 18 are also of a molded elastomer. The sheaths 24, 26 and end sections 16, 18 are preferably integrally molded and are joined at their respective ends.

Each of the rails is integrally molded and is configured to the particular gasket construction. A preferred rail is plastic, and preferably a thermoplastic material such as a glass filled nylon material comprising about 33% glass fibers and 67% nylon. A suitable nylon is Nylon 6/6, obtained from Hoechst Celanese Corporation under the designation NY/M1503. Another suitable rail material comprises filled polyphenylene sulfide having about 40% glass fibers and 60% polyphenylene sulfide, such as one obtained from LNP Corporation under the designation Thermocomp OF-1008. The glass fibers used may be short, medium or long.

Each of the rails provides a number of formations which project from the major surfaces, the upper and lower surfaces thereof, and which are integrally formed therewith.

First, each of the rails has a generally flat main body 30 of a first, generally uniform thickness. Each rail further is provided with a plurality of longitudinally spaced compression stops 32. Stops 32 project both upwardly and downwardly from main body 30 and are, as may be seen, substantially greater in thickness from top to bottom, than the thickness of the main body, and desirably by a factor of at least three. Each of the stops 32, together with the main body 30, defines an opening 34 through which an associated fastener may pass. Because the purpose of the stops 32 is to control and limit the degree of compression of the gasket overall, and especially in the zones of the side sections, while permitting compression of the associated elastomer sheaths to effect sealing, they are of a lesser thickness than the sheaths.

The rails also define and include a number of other elements. These include a plurality of apertures 36 which are positioned along the length of the rails. Apertures 36 are provided so that during molding material may pass therethrough to integrate the rail with the elastomer sheath of the associated side section.

The rails also include a plurality of spaced projecting members and abutments along the length of the rail for appropriately positioning each rail in its associated side section. These include a plurality of projections 38 which extend from one surface of the rail between the stops and more particularly between each pair of adjacent apertures 36. These help insure that the elastomer will flow through the apertures 36 during the molding process and that the thickness of the elastomer sheath at that surface of the rail will be correctly provided during molding. Additional abutments include several pairs of projections 40, 42 which extend from opposite surfaces of the rail adjacent edges of those surfaces. The abutments of each pair may be of different heights, as best seen in FIG. 4. The heights of projections 40, 42 are generally the same as the corresponding projecting portions of the stops 32. These projections 40, 42 provide standoffs which assist in the molding process to make certain that the rubber sheaths are molded to the desired dimensions.

Further abutments or directors 44, 46 project from opposite surfaces of each rail at spaced locations. These are generally V-shaped and preferably confront the zones at which elastomer is directed into the mold to form the elastomeric sheaths. They assist in directing the molten elastomer flow to insure proper and complete filling of the mold. The director 44 may be of generally the same height as the similarly projecting portion of the stop 32, whereas the director 46 may be much less in height than the corresponding projecting portion of the stop 32 where it is somewhat less critical to control the rubber thickness as closely.

Thus, it may be appreciated that the abutments and projections perform important functions in providing properly formed elastomeric sheaths which will suitably seal along the confronting flanges of the engine parts to be sealed and to help control, as well, the degree to which the stops 32 will be recessed below the surfaces of the elastomeric sheaths in accordance with the designed respective thicknesses.

To control the thickness of the molded elastomer, alternatives to abutments 40, 42, 44, 46 may be provided. Although in some circumstances the abutments as illustrated may be sufficient to prevent the rails from becoming deformed under the molding pressures used, in other situations the molding pressures may tend to distort the rails, hence cause undesired variations in thickness in the elastomeric sheathing.

In such situations additional or alternative means for maintaining the positioning of the rail during molding may be desirable. One such alternative is indicated in FIG. 5 by mold surfaces M shown in dotted line. These mold surfaces serve to clamp the rail edge during molding to hold the rail centered. Although only one such edge is shown as being so clamped in FIG. 5, it is apparent that both edges may be so clamped by appropriate mold surfaces.

Another alternative is shown in FIG. 7. FIG. 7 is like FIG. 4, but rather than having abutments, such as projections and directors 40, 42, 44, 46 (although it may retain such also if desired), FIG. 7 illustrates the rail as being retained during molding in a centered portion by pins P provided on the mold surfaces M'. The pins P preferably project upwardly and downwardly between each pair of spaced compression stops 32. There is at least one pair of opposed pins P located between the compression stops, preferably about halfway between, although more than one such pair of pins P (upper and lower) can be so used, as is illustrated by FIG. 7.

As will be seen in FIG. 5, supplemental longitudinally extending sealing beads 48, 50 may be provided as well. Like similar beads as used in the past, these help provide the most effective seal when the gasket assembly 10 of this invention is used.

The embodiment of FIG. 6 is similar to that of FIGS. 1-5. Accordingly the same part numbers have been used. The principal difference is that means are provided for stiffening the rails, hence the gasket assembly respective side sections. In FIG. 6, the side section 12' includes a rail 20' which has a main body portion 30', a stop 32', a stop opening 34' and an elastomeric sheath including longitudinally extending sealing beads 48', 50'. The apertures, abutments and projections described above relative to the embodiment of FIGS. 1-5 are used as well, except that projections 40, 42 and directors 44, 46 may not be necessary or present.

As seen in FIG. 6, rail 20' includes at least one stiffening rib projecting from a major surface of the rail at a right angle thereto adjacent an edge of the rail surface. The projecting stiffening ribs in the FIG. 6 embodiment includes two pairs of such stiffening ribs. Each pair includes projecting rib elements 60, 62 which projects upwardly and downwardly at the edge of the adjacent surfaces. The stiffening ribs extend along at least the substantial lengths of the rail edges. The heights of the ribs are substantially the same as those of the projecting portions of the stops 32'. Thus, they both stiffen, but do not interfere with the compression stopping function of the stops 32'. They may assist in this function adjacent the zones of the stops or they may be slightly reduced in height at those zones so that they do not, under any normal circumstances of use, assist in the compression controlling function of stops 32'.

As will now be apparent from the foregoing description, a greatly improved and highly advantageous gasket assembly is provided. It substantially reduces the cost of such a gasket assembly, by reducing material cost, assembly time and cost and by reducing processing time. It eliminates inspection time and very importantly insures that the gasket will be correctly assembled with the required compression control being provided with certainty at each location where it is desired. The gasket assembly is easily installed and seals in a highly effective manner. When the stiffening ribs are used, the gasket assembly is even easier to handle and to install than are the available prior art gaskets.

From the foregoing, it will be apparent to those skilled in the art that further modifications may be made and provided without departing from the spirit of the invention. Accordingly, the scope of the invention is to be considered to be limited only to the extent made necessary by the claims.

What is claimed is:

1. A molded gasket assembly having an integrally formed pair of elastomeric side sections and pair of elastomeric end sections and a rail in and associated with each of said side sections, each said rail comprising an elongated rigid plastic member having a generally flat main body of a first thickness and a plurality of integrally formed, longitudinally spaced stops, each said stop defining a fastener opening through which a fastener is adapted to pass, said stops being of a height substantially greater than said first thickness, but less than the thickness of the associated side section, and a plurality of apertures formed in said rail through which elastomer projects to integrate said rail and the elastomer of the associated side section, and wherein each said rail further includes a plurality of spaced abutments integrally formed with said rail and positioned along the length of the rail, said abutments including projections extending from at least one surface of said rail between pairs of adjacent stops and being of a height substantially equal to the height of the stops for appropriately positioning the rail in said side section and to minimize deformation of the rail during molding.

2. The molded gasket assembly of claim 1, and wherein said stops comprise stop portions projecting from opposite surfaces of said flat main body, and said abutments comprise projections extending between pairs of adjacent apertures and include projections extending from opposite surfaces of said rails, said projections being of heights substantially equal to the heights of the stop portions on the respective surfaces of said rail.

3. The molded gasket assembly of claim 2, and wherein each of said rails further includes at least one stiffening rib projecting from a surface of said rail at a right angle thereto adjacent an edge of said surface.

4. The molded gasket assembly of claim 3, and wherein each of said rails defines at least two stiffening ribs, and wherein a pair of said stiffening ribs project from opposite surfaces of said rail adjacent the same edge of said surfaces.

* * * * *